United States Patent Office 2,868,027
Patented Jan. 13, 1959

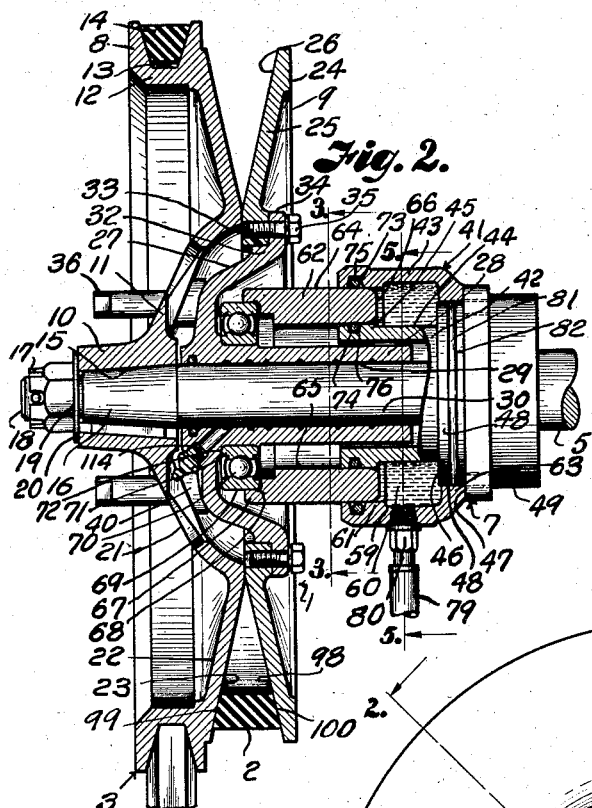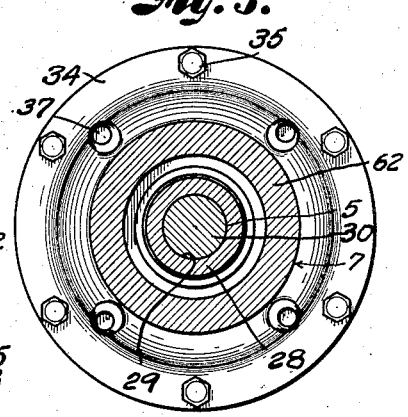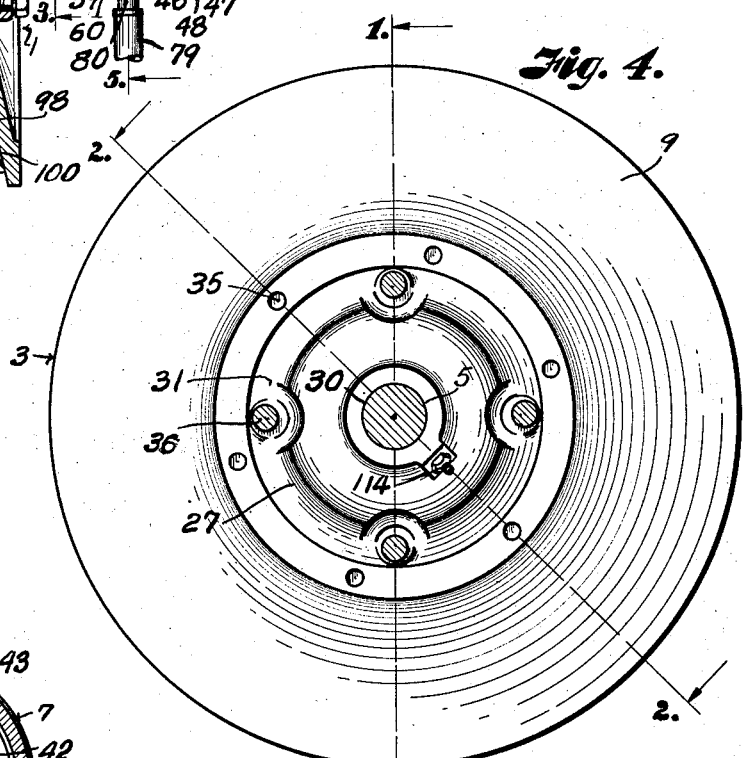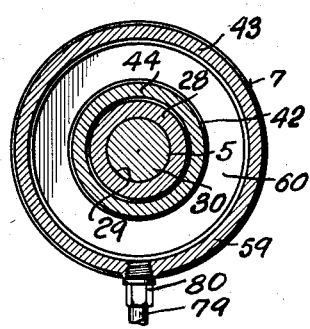

2,868,027

VARIABLE SPEED CHANGE MECHANISM

Lester E. Oberholtz, Kansas City, and Lawrence E. Allen, Independence, Mo., assignors to Allis-Chalmers Manufacturing Company, Milwaukee, Wis.

Application August 8, 1955, Serial No. 527,079

3 Claims. (Cl. 74—230.17)

This invention relates to a variable speed mechanism of the type including an endless belt operating over driving and driven pulleys wherein the belt contacting members of the pulleys are relatively inversely adjustable for changing the effective radii on which the belt operates.

A principal object of the invention is to provide a variable speed mechanism of this character with a pressure fluid operating mechanism for one of the pulleys and an automatically responsive mechanism for the other to maintain a constant drive through the entire speed range.

Another object of this invention is to provide an improved cylinder and piston assembly for containing the pressure fluid used in variable speed mechanisms of the above outlined character.

A further object of this invention is to provide a cylinder and piston assembly of the above outlined character which is simple and inexpensive to manufacture, easily assembled and disassembled, and which is dependable in operation.

With the foregoing objects in mind, the invention contemplates the provision of a two section annular cylinder assembly in which the two sections are maintained in fluid tight relation to each other by the fluid pressure which exists within the cylinder when it is in operation.

Other objects of the invention are to provide a fluid pressure actuated operating mechanism with nonrotating piston and cylinder elements, thereby simplifying the pressure fluid connection and the seal between the piston and cylinder; to provide an antifriction connection between the piston element and the shiftable member of the driving pulley; to provide a direct coupling between the fixed and shiftable members of the driving pulley; and to provide a generally simplified mechanism which is easily assembled and adapted for trouble free service.

In accomplishing these and other objects of the invention, we have provided improved structure, the preferred form of which is illustrated in the accompanying drawings, wherein:

Fig. 2 is a similar section through the driving pulley showing the parts in position for effecting maximum speed of the driven pulley;

Fig. 3 is a cross section through the pressure fluid actuated operating mechanism on the line 3—3 of Fig. 2;

Fig. 4 is a section through the driving pulley on the line 4—4 of Fig. 1, particularly illustratnig the coupling pins for connecting the fixed and shiftable members of the pulley; and Fig. 5 is a cross section through the hydraulic operating mechanism on the line 5—5 of Fig. 2.

Figure 1:
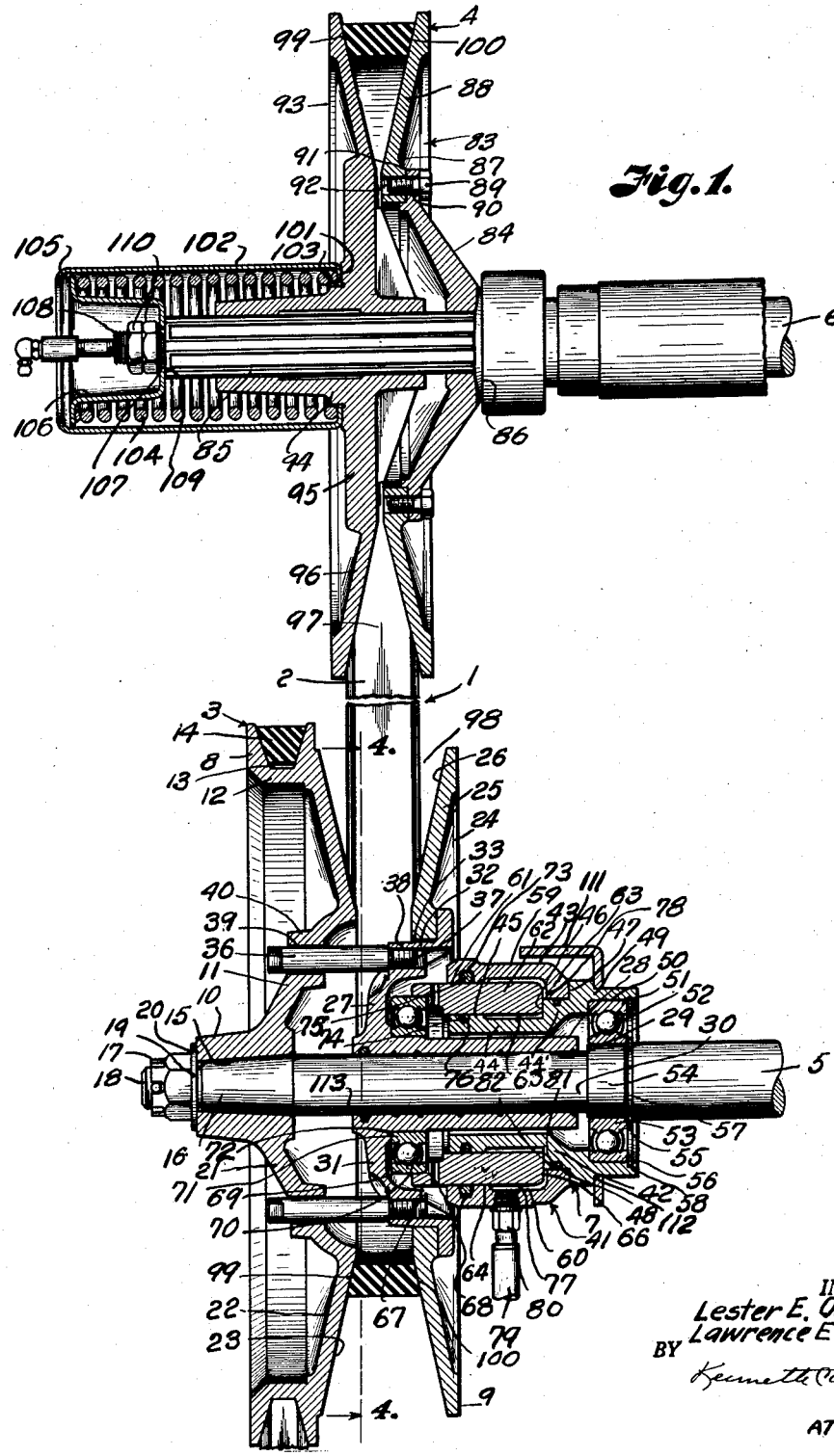
Fig. 1 is a section through the driving and driven pulleys of a variable speed mechanism embodying the features of the present invention and showing position of the parts for the minimum low speed drive of the driven pulley.

Referring more in detail to the drawings, and particularly to Fig. 1, reference numeral 1 designates a variable speed mechanism constructed in accordance with the present invention and includes an endless V-belt 2, a driving pulley 3, and a driven pulley 4, the pulleys being mounted on spaced apart parallel shafts 5 and 6, respectively, to be operated at variable relative speeds under control of a pressure fluid operating mechanism 7. The driving pulley 3 includes a member 8 that is fixed on the shaft 5 and a complementary member 9 that is shiftable axially on the shaft to and from the member 8. The member 8 includes a hub 10 having a circumferential web 11 terminating at the periphery in a lateral annular flange 12, the flange 12 being provided with a circumferential groove 13 for accommodating a driving belt 14. In the illustrated instance, the hub 10 has a tapered axial bore 15 for accommodating a tapered portion 16 on the shaft 5. The hub 10 is wedged tightly on the taper by a nut 17 which is threaded on a terminal 18 of the shaft 5 and which sets on a washer 19 contacting the outer face 20 of the hub 10 to draw the taper of the hub over the taper of the shaft. Hub 10 and tapered portion 15 are also joined in a conventional manner by a key (not shown). The web portion 11 includes an outer, inwardly flaring center portion 21 terminating in an oppositely flaring peripheral portion 22 which carries the lateral flange 13. The flaring portion 22 constitutes one side contact face 23 for the belt 2. The complementary member 9 includes a ring 24 having an outwardly flaring portion 25 that is provided with a belt contacting face 26 diverging relatively to the belt contacting face 23 of the member 8. The ring 24 is mounted on a hub 27 axially shiftable on the shaft 5 by means of the pressure fluid operating mechanism 7. The hub 27 includes an elongated sleeve portion 28 having a bore 29 for passing a bearing portion 30 of the shaft 5. Extending circumferentially at the end of the sleeve portion 28 nearest the pulley member 8, is an annular web 31 which corresponds in shape to the central web portion 21 of the pulley member 8. The web 31 terminates in a circumferential flange 32 having an external diameter to fit snugly within the opening 33 of the ring 24. The ring 24 (Fig. 2) is secured to a terminal flange 34 of the hub 27 by fastening devices, such as cap screws 35, extending through suitable openings in the terminal flange 34 and into aligned threaded openings of the ring. The pulley members 8 and 9 (Fig. 1) are interconnected by coupling pins 36 having reduced, threaded ends 37 engaging in threaded openings 38, that are provided in the portion 31 of the hub 27. The coupling pins 36 thus extend from the hub 27 in circumferentially spaced parallel relation with the axis of the shaft 5. The pins 36 are of sufficient length to slidably extend through registering openings 39 that are provided within bosses 40 formed in the flaring portion 21 of the pulley member 8.

The hydraulic mechanism 7 (Fig. 2) includes a cylinder 41 which, for convenience of machining and assembly, is made up of an inner part or sleeve 42 and an outer part 43. The inner part 42 includes a sleeve portion 44 (Fig. 2) of slightly larger inner diameter than the outer diameter of the sleeve portion 28 of the hub 27. The sleeve portion 44 has an outer circumferential rib 45 on the left hand portion thereof as viewed in Fig. 1. The right hand end of the sleeve portion 44 has a radially outward extending flange or end portion 44' presenting a pair of inner and outer or first and second shoulders 46 and 47 positioned in stepped axially spaced relation to each other. The shoulder 46 is of larger diameter than the rib 45 and has an axially extending cylindrical face 48 on which flange 63 is mounted, as will be more fully described below. The cylindrical face terminates at second shoulder 47 which is of a greater diametrical extent than first shoulder 46. Projecting axially from the shoulder 47 is a collar 49 having a counterbored recess 50 in which is mounted an outer race 51 of an antifriction bearing or first bearing means 52 and which has its inner race 53 mounted on a step portion 54 of the shaft 5. The inner and outer races are retained in position by lock rings 55 and 56 engaged in an annular groove 57 of the shaft 5 and a groove 58 in the collar 49, respectively, as best shown in Figs. 1 and 2. The cylindrical outer sleeve portion or part 43 (Fig. 2) encircles the sleeve portion 44 of the inner part 42 and has a cylindrical wall 59 radially spaced therefrom to form an annular pressure chamber 60 therebetween. The left hand end of the wall 59 as viewed in Fig. 2 has an internal circumferential rib 61 corresponding with the rib 45 and coacting therewith for slidably mounting therebetween the piston member 62 of the operating mechanism. The right hand end of the outer part 43, which forms part of the closed end of the cylinder, has a flange or end portion 63 extending axially inward and of suitable diameter to be axially slidably received over the cylindrical face 48 and to abut against the outer shoulder 47 (Figs. 1 and 2), whereby the outer part is retained in concentric relation with the inner part. The cylindrical face 48 and shoulder 47 cooperate with each other to form a cylindrical seat which slidably receives the end portion 63. It will be understood that the shoulder 46 and flange 63 cooperate to form the inner wall or closed end of the piston chamber. The piston 62 (Fig. 2) is of annular form and has cylindrical outer and inner faces 64 and 65, respectively, of a diameter to slidably engage the ribs 45 and 61. The piston 62 (Fig. 1) is of sufficient length so that the right hand end 66 thereof abuts against the inner of the stepped shoulder 46 which, in addition to forming a portion of the inner wall of the piston chamber, operates as an annular stop member to limit axially inward movement of the piston and to leave at the left hand end a projecting portion 67. The projecting portion 67 has an internal annular recess 68 seating the outer race 69 of an antifriction bearing or second bearing means 70, the inner race 71 of which is on the sleeve portion 28 of the hub 27 and seats against an annular stop shoulder 72. That is, the second bearing means 70 is, as shown in Fig. 1, operatively interposed in thrust transmitting relation between the piston 62 and the shiftable member 9.

In order to provide seals between the outer and inner races of the piston and the corresponding races of the ribs 45 and 61 of the inner and outer parts of cylinder, the ribs thereof are provided with circumferential grooves 73 and 74 for containing O rings 75 and 76. With this arrangement, a sealed annular space 77 is at all times maintained about the circumference of the piston to connect with an annular space 78 at the right hand end of the piston when the piston is seated against the inner shoulder or stop member 46. The annular space 78 provides access so that the pressure medium may act against the end face 66 of the piston 62 to start movement of the piston when a pressure fluid is admitted through a pipe connection 79. Pipe connection 79 is connected to fluid chamber 60 by means of a nipple 80. The space 78 at the end of the piston is provided by making the annular face of the flange 63 of a lesser axial width than the cylindrical face 48 which extends between the stepped shoulders 46 and 47. A fluid tight seal is effected between the cylindrical face 48 and the inner face of the flange 63 of the outer part by an O ring 81 (Fig. 1) seated in an annular groove 82 (Fig. 2) formed in the cylindrical face of the inner part.

The driven pulley includes a fixed part 83 (Fig. 1) having a conical hub portion 84 keyed or splined to an end 85 of the shaft 6 and engaging an abutment 86 of shaft 6 whereby the pulley part 83 is kept in substantially fixed, spaced relation with respect to the member 8 of the driving pulley 3. Fixed to the outer periphery of the hub 84 is a ring 87 having an outwardly flaring portion 88 substantially corresponding with the angle of the portion 23 of the driving pulley member 8. The ring 87 is fixed to the hub portion by cap screws 89 that extend through openings 90 in an annular flange 91 of the hub and into threaded openings 92 in the inner circumference of the ring. The driven pulley also includes a complementary part 93 having an integral hub portion 94 axially slidably secured to the splined end 85 of the shaft 6 and which is adapted to move axially to and from the part 83. The hub portion 94 has a radially extending portion 95 that terminates in an outwardly tapering portion 96 corresponding with and diverging from the taper of the ring 83 so as to form therebetween an annular belt space 97 which cooperates with a similar space 98 between the members of the driving pulley to contain the belt 2 therebetween. The belt 2 has tapering side faces 99 and 100 which frictionally engage the inner tapered faces of the respective pulley members so as to form driving and driven contacts therewith.

Seated against the shoulder 101 of the portion 94 is a cylindrical spring housing 102. Positioned within the spring housing 102 and having one end engaging against an inturned flange 103 of the housing is a coil spring 104, the outer end of which engages a flange 105 on a spring seat 106. The spring seat 106 is of cup shape and the center thereof is provided with an opening 107 to pass a reduced threaded terminal 108 of the shaft 6. The spring seat is retained in contact with a shoulder 109 that is formed by the reduced extension 108, by lock nuts 110, as shown in Fig. 1. It is thus apparent that the spring 104 acting between the spring seat 106 and the shoulder 101 of the pulley part 93 keeps the spring housing 102 in coaxial position on the pulley and biases pulley part 93 toward pulley part 83.

In mounting the speed change mechanism, the cylinder 41 of the pressure fluid mechanism 7 is fixed to a stationary part 111. In the illustrated instance, the portion 49 of the inner part of the cylinder extends through an opening 112 in the part 111. The inner part of the cylinder is suitably bolted or otherwise secured to the part 111 by means (not shown).

Referring to Fig. 1, a seal is effected between the left hand end of the sleeve portion 28 and the bearing portion 30 of the shaft 5 by means of an O ring 113. Lubricant may be supplied to the bearing portion of the shaft by way of a pressure fitting 114, as shown in Figs. 2 and 4.

A speed changing mechanism constructed and assembled as described, is adapted for various uses. For example, the shaft 5 may be the shaft that supplies power to the separating mechanism of a self-propelled harvester and the shaft 6 may be the shaft driving the traction wheel of the machine, in which case, the shaft 5 is driven by the belt 14 from the engine (not shown), which supplies the necessary power, while the shaft 6 is driven at variable speeds through operation of the variable speed pulleys 3 and 4.

When the belt 14 is in operation, it directly drives the member 8 of the pulley 3 and indirectly drives the member 9 through the coupling pins 36. The shaft 5 rotates within the antifriction bearing 52 and the hub 27 rotating with shaft 5 rotates within the antifriction bearing 70. In other words, the first and second bearing means 52 and 70 support the two piece cylinder 42, 43 and piston 63 and afford relative rotation between these structures and the shaft 5. The piston 62 is prevented from rotating with hub 27 by there being provided greater frictional resistance at the O rings 75 and 76 than is present at the thrust bearing 70.

Fig. 1 shows the position of variable speed pulleys 3 and 4 with shaft 6 being driven at its lowest speed. Belt 2 is contacting portions of pulley faces 23 and 26 radially spaced a minimum distance from the axis of shaft 5, and belt 2 is contacting portions of pulley faces 99 and 100 radially spaced a maximum distance from the axis of shaft 6. In this position, the coil spring 104 is effective for retaining pulley members 83 and 93 in tight contact with belt 2 thereby producing tension in belt 2 sufficient to maintain driving contact with driving pulley members 8 and 9.

When it is desired to speed up the shaft 6, fluid under pressure is admitted through the pipe 79 to act against the end face 66 of the piston 62 to move the piston 62 toward the left (Figs. 1 and 2) of the cylinder 41 and to shift the pulley member 9 toward the pulley member 8 and this pressure fluid also acts against the right hand end of outer member 43 retaining and urging same in abutting relation with surface 47. This shifting force is transmitted from the left hand end of piston 62 through antifriction bearing 70 to pulley member 9. During this movement of pulley member 9, the coupling pins 36 slide through the openings 39 in pulley member 8. As the pulley member 9 moves toward the pulley member 8, the belt 2 is wedged radially outward toward the periphery of pulley members 8 and 9. As a result of this outward movement of belt 2 on pulley members 8 and 9, belt 2 is forced radially inward between driven pulley members 83 and 93 causing pulley member 93 to move to the left (Fig. 1) against the bias of coil spring 104. This shifting of the pulley members results in increasing the effective diameter of the driving pulley 3 and reducing the effective diameter of the driven pulley 4 so that the shaft 6 now operates at a faster speed despite the fact that a constant speed of the shaft 5 has been maintained.

When it is desired to reduce the speed of shaft 6, fluid under pressure is allowed to be exhausted from the annular pressure chamber 60 through the pipe 79 by conventional means (not shown) whereupon the bias of spring 104 acting upon the pulley member 93 moves same toward the pulley member 83 of the driven pulley causing the belt 2 to climb in the driven pulley and the transmitted tension in belt 2 causes a corresponding movement to the right of pulley member 9 away from pulley member 8 with a movement of the contacts of belt 2 with pulley members 8 and 9 radially toward the axis of shaft 5 causing the fluid to be forced from the cylinder through pipe 79 by piston 62.

It is to be noted that piston 62 is not attached to any member of the speed change mechanism. At its left hand end it abuts bearing 70 and may abut shoulder or stop member 46 in one position of adjustment as is shown in Fig. 1. It should also be noted that outer part 43 is not attached to inner part 44 by any fastening elements but is only axially movable thereon and is kept in abutting relation with surface 47 by means of the pressure fluid in chamber 60.

From the foregoing, it is seen that a speed change mechanism, a readily machinable and readily assembled or disassembled mechanism, has been provided including a fluid pressure actuated operating mechanism with nonrotating piston and cylinder elements coaxially mounted about the drive shaft of the mechanism and thereby providing a simplified efficient speed change mechanism.

Now having described the invention, it is to be understood that the invention is not to be limited to the specific details herein set forth but only by the scope of the appended claims.

It is claimed and desired to secure by Letters Patent:
1. In a variable speed transmission, the combination of a V-belt; a pair of belt contacting members having facing sides diverging outwardly to engage the V-belt therebetween; a shaft supporting said members for rotation on a fixed axis with one of said members being shiftable thereon to and from the other member to effect a radial change in the contact point of the V-belt with said diverging sides; a fluid pressure cylinder comprising a cylindrical inner sleeve part positioned in surrounding radially spaced relation to said shaft and having a radially outward extending end portion, a cylindrical outer sleeve part positioned in radially spaced surrounding relation to said inner sleeve and having a radially inward extending end portion, one of said end portions having a cylindrical seat, the other of said end portions positioned in abutting relation with said cylindrical seat to define an annular piston chamber closed at one end; a first bearing means mounted in supporting relation between said shaft and said one end of said chamber to afford relative rotation between the latter and said shaft; an annular piston positioned in said piston chamber for axial back and forth sliding movement and having one end projecting through the open end of said piston chamber; a second bearing means operatively interposed in thrust transmitting relation between said shiftable member and said one end of said piston and affording relative rotation between the latter and said shiftable member; and means for admitting pressure fluid to said chamber for actuating said piston.

2. In a variable speed transmission, the combination of a V-belt; a pair of belt contacting members having facing sides diverging outwardly to engage the V-belt therebetween; a shaft supporting said members for rotation on a fixed axis with one of said members being shiftable thereon to and from the other member to effect a radial change in the contact point of the V-belt with said diverging sides; a fluid pressure cylinder comprising a cylindrical inner sleeve part positioned in surrounding radially spaced relation to said shaft and having a radially outward extending end portion, said end portion having a cylindrical seat, a cylindrical outer sleeve part positioned in radially spaced surrounding relation to said inner sleeve and having a radially inward extending flange slidably abutting said cylindrical seat to define an annular piston chamber closed at one end; a first bearing means mounted in supporting relation between said shaft and said one end of said chamber to afford relative rotation between the latter and said shaft; an annular piston positioned in said piston chamber for axial back and forth sliding movement and having one end projecting through the open end of said piston chamber; a second bearing means operatively interposed in thrust transmitting relation between said shiftable member and said one end of said piston and affording relative rotation between the latter and said shiftable member; means for admitting pressure fluid to said chamber, said pressure being effective for moving said piston and for urging said flange in abutting fluid sealing relation with said cylindrical seat.

3. In a variable speed transmission including a V-belt; a pair of belt contacting members having facing sides diverging outwardly to engage said V-belt therebetween; means supporting said members for rotation on a fixed axis with one of said members being shiftable to and from the other member to effect a radial change in the contact point of the V-belt with said facing sides; a pressure fluid cylinder having open and closed ends comprising a cylindrical sleeve inner part mounted in radially spaced surrounding relation to said supporting means and having a radially outward extending end portion, a cylindrical sleeve outer part positioned in radially spaced surrounding relation to said inner part and having a radially inward extending end portion, one of said end portions having first and second radially extending shoulders positioned in axially spaced relation to each other, and to said open end of said cylinder, said second shoulder having a greater diametrical extent than said first shoulder to define a cylindrical seat, the other of said end portions being slidably positioned in abutting relation to said cylindrical seat on said one end portion to provide an annular piston chamber closed at one end and coaxial with said belt contacting members; a first bearing means mounted between said supporting means and said closed end of said cylinder to afford relative rotation between the latter and said supporting means; a piston slidable in said piston chamber and having one end projecting through the open end of said cylinder, the other end of said piston having an end face; a second bearing means operatively interposed in thrust transmitting relation between said shiftable member and said one end of said piston and affording relative rotation between the latter and said shiftable member; means for admitting pressure fluid to said chamber for actuating said piston; and an annular internal stop presented by one of said end portions for engaging said piston at the closed end of said chamber, said stop defining an annular passage between the other of said end portions and said piston end face thereby exposing a portion of said end face to fluid pressure, the latter being effective for moving said piston and for retaining said other end portion in abutting relation with said cylindrical seat.

References Cited in the file of this patent

UNITED STATES PATENTS

| | | | |
|---|---|---|---|
| 1,044,617 | Wray | Nov. 19, | 1912 |
| 2,135,214 | Moore | Nov. 1, | 1938 |
| 2,198,940 | Heyer | Apr. 30, | 1940 |
| 2,346,868 | Perry | Apr. 18, | 1944 |
| 2,587,230 | Schaad | Feb. 26, | 1952 |
| 2,660,069 | Horne | Nov. 24, | 1953 |
| 2,779,203 | Eubanks | Jan. 29, | 1957 |

FOREIGN PATENTS

| | | |
|---|---|---|
| 17,167 | Great Britain | of 1911 |
| 3,383 | Great Britain | of 1912 |